UNITED STATES PATENT OFFICE.

MURRAY GIBSON, OF PHILADELPHIA, PENNSYLVANIA.

COMPOSITION FOR THE ORNAMENTATION OF WALLS AND CEILINGS.

SPECIFICATION forming part of Letters Patent No. 290,228, dated December 18, 1883.

Application filed May 12, 1883. (No specimens.)

*To all whom it may concern:*

Be it known that I, MURRAY GIBSON, a citizen of the United States, residing in the city and county of Philadelphia, and State of Pennsylvania, have invented a new and useful Composition for the Ornamentation of Walls and Ceilings, of which the following is a specification.

The object of my invention is the production of an improved plastic compound which shall be adapted to be applied to a wall, ceiling, or other surface to be decorated, whether such surface be composed of brick, stone, concrete, or other material, either in its natural state, coated with plaster, or faced with canvas or other textile or fibrous fabric, and which, when applied, shall be adherent thereto, and be also adapted to set into a rigid mass.

This compound is especially designed to be employed in the practice of a method of ornamenting walls and ceilings invented by me, application for patent for which was executed by me under the same date as the date of execution of this application.

This compound is especially designed for the ornamentation of exteriors as opposed to the ornamentation of interiors of dwellings or other buildings; and it is especially designed to be applied to brick, stone, or concrete surfaces, although it is applicable, as already stated, to other surfaces.

The compound is composed of Portland cement, sawdust, and glue-water or dissolved glue. The Portland cement, which forms the base of the compound, and the sawdust are to be added together and thoroughly commingled. The glue-water is then to be added to mixture and in turn thoroughly commingled therewith until the mass assumes a pasty consistency.

I do not restrict myself to any specific proportions, but prefer to take two parts, in bulk, of cement to one part of sawdust, adding sufficient glue-water to render the mass of a pasty and coherent consistency. The sawdust serves to thicken and render rough the surfaces of the resultant compound, and, when the pasty mass becomes too thin under the application of the glue-water, is to be added in sufficient quantities to effect the required thickening, which is a matter depending on the skill of the workman, while the glue-water is to be added to thin the compound, in a manner likewise dependent upon the judgment of the workman.

When it is desired to cause the mass to set very rapidly upon the surface to which it is ultimately applied, the glue-water should contain less glue or be more diluted, and when it is desired that the setting should be more slow the glue-water should contain more glue.

The mass in its pasty condition is in readiness to be applied to the surface which is to be ornamented with it according to my method already referred to.

Having thus described my invention, I claim—

A compound for the ornamentation of walls, ceilings, and other surfaces, composed of Portland cement, sawdust, and glue-water, substantially as described.

In testimony whereof I have hereunto signed my name this 4th day of April, A. D. 1883.

MURRAY GIBSON.

In presence of—
JOHN JOLLEY, Jr.,
F. N. DIXON.